US012790520B2

(12) United States Patent
Bieber et al.

(10) Patent No.: US 12,790,520 B2
(45) Date of Patent: Nov. 10, 2026

(54) PRESSURE-SENSITIVE ADHESIVE COMPOSITIONS FOR ELECTRONIC BONDING APPLICATIONS

(71) Applicant: 3M INNOVATIVE PROPERTIES COMPANY, St. Paul, MN (US)

(72) Inventors: Pierre R. Bieber, Dusseldorf (DE); John W. McAllister, St. Paul, MN (US); Benjamin J. Bending, St. Paul, MN (US); Zhong Chen, Woodbury, MN (US); Vasav Sahni, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 977 days.

(21) Appl. No.: 15/733,468

(22) PCT Filed: Feb. 8, 2019

(86) PCT No.: PCT/IB2019/051041

§ 371 (c)(1),
(2) Date: Aug. 3, 2020

(87) PCT Pub. No.: WO2019/155423

PCT Pub. Date: Aug. 15, 2019

(65) Prior Publication Data

US 2021/0102094 A1 Apr. 8, 2021

(30) Foreign Application Priority Data

Feb. 8, 2018 (EP) .................................... 18155824

(51) Int. Cl.

| | |
|---|---|
| ***C09J 7/35*** | (2018.01) |
| ***C08K 5/32*** | (2006.01) |
| ***C08L 45/02*** | (2006.01) |
| ***C08L 47/00*** | (2006.01) |
| ***C08L 93/04*** | (2006.01) |
| ***C09J 7/38*** | (2018.01) |
| ***C09J 123/22*** | (2006.01) |

(52) U.S. Cl.

CPC ................. *C09J 7/383* (2018.01); *C08K 5/32* (2013.01); *C08L 45/02* (2013.01); *C08L 47/00* (2013.01); *C08L 93/04* (2013.01); *C09J 7/35* (2018.01); *C09J 123/22* (2013.01); *C08L 2203/206* (2013.01); *C08L 2312/00* (2013.01); *C09J 2203/326* (2013.01); *Y10T 428/2883* (2015.01)

(58) Field of Classification Search

None

See application file for complete search history.

(56) References Cited

U.S. PATENT DOCUMENTS

| | | | | |
|---|---|---|---|---|
| 4,268,334 | A | 5/1981 | Harris | |
| 4,882,163 | A * | 11/1989 | Guse | A61K 9/7053 424/448 |
| 5,605,964 | A | 2/1997 | Groves | |
| 5,677,376 | A | 10/1997 | Groves | |
| 6,437,038 | B1 * | 8/2002 | Chen | A61L 15/585 602/41 |
| 2004/0241434 | A1 | 12/2004 | Yamaguchi | |
| 2004/0258936 | A1 * | 12/2004 | Yamaguchi | C09J 7/383 525/332.5 |
| 2008/0213579 | A1 | 9/2008 | Lee | |
| 2012/0214936 | A1 | 8/2012 | Fujita | |
| 2013/0251990 | A1 | 9/2013 | Higashi | |
| 2014/0037952 | A1 | 2/2014 | Shigetomi | |
| 2014/0272201 | A1 | 9/2014 | Takeda | |
| 2015/0024196 | A1 | 1/2015 | Hayashi | |
| 2015/0056442 | A1 | 2/2015 | Hayashi | |
| 2016/0145406 | A1 * | 5/2016 | Bieber | C09J 123/16 521/91 |
| 2023/0274122 | A1 * | 8/2023 | Sugimura | H01Q 7/00 235/492 |

FOREIGN PATENT DOCUMENTS

| | | |
|---|---|---|
| CN | 102516899 | 6/2012 |
| JP | S56-155741 | 12/1981 |

(Continued)

OTHER PUBLICATIONS

John Rehner, Jr. & Paul J. Flory, "Vulcanization Reactions in Butyl Rubber", Industrial and Engineering Chemistry, pp. 500-506, vol. 38, No. 5, May 1946 (Year: 1946).*
Information sheet "Benzene, 1,4-dinitroso-, homopolymer" from CAS Common Chemistry, retrieved on May 1, 2023 (Year: 2023).*
Product specification Escorez 5615 from ExxonMobil, Apr. 1, 2025 (Year: 2025).*
Istvan Benedek et al., "Handbook of Pressure-Sensitive Adhesives and Products", CRC Press, 2009, pp. 2-10-2-11 (Year: 2009).*
"Exxon™ Bromobutyl Rubber Compounding and Applications Manual", Exxon Mobil Corporation, (Date unknown but believed to be prior to the date of the filing of the present application.), pp. 1-48.
Gowenlock, "Dinitroso and Polynitroso Compounds", Chemical Society Reviews. Sep. 2005, vol. 34, No. 9, pp. 797-809.

(Continued)

*Primary Examiner* — Anish P Desai
(74) *Attorney, Agent, or Firm* — Kathleen B. Gross

(57) ABSTRACT

The present disclosure relates to a curable pressure sensitive adhesive composition comprising: a) a butyl rubber component in an amount greater than 40 wt %; b) a tackifier in an amount greater than 1 wt %; c) a multifunctional crosslinking agent comprising at least two nitroso functional groups; and d) optionally, a hydrocarbon plasticizer; wherein the weight percentages are based on the total weight of the curable pressure sensitive adhesive composition. In another aspect, the present disclosure is directed to a method for protecting an electronic device or an electronic component from moisture and air permeation, wherein the method comprises the step of using a pressure sensitive adhesive composition as described above. According to still another aspect, the present disclosure is directed to the use of a pressure sensitive adhesive composition as described above for manufacturing an electronic device.

20 Claims, No Drawings

(56) References Cited

FOREIGN PATENT DOCUMENTS

| | | |
|---|---|---|
| JP | 5108201 | 12/2012 |
| SU | 500221 | 1/1976 |

OTHER PUBLICATIONS

International Search Report for PCT International Application No. PCT/IB2019/051041, mailed on Apr. 8, 2019, 4 pages.

1507 Extended EP Search Report for EP18155824.8, Date Jul. 18, 2018, 7 pages.

* cited by examiner

PRESSURE-SENSITIVE ADHESIVE COMPOSITIONS FOR ELECTRONIC BONDING APPLICATIONS

CROSS REFERENCE TO RELATED APPLICATIONS

This application is a national stage filing under 35 U.S.C. 371 of PCT/IB2019/051041, filed Feb. 8, 2019, which claims the benefit of EP Application Serial No. 18155824.8, filed Feb. 8, 2018, the disclosure of which is incorporated by reference in its/their entirety herein.

TECHNICAL FIELD

The present disclosure relates generally to the field of pressure sensitive adhesives (PSA), more specifically to the field of rubber-based pressure sensitive adhesives for use in the manufacturing of electronic devices. The present disclosure also relates to a method of manufacturing electronic devices.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives.

Pressure-sensitive adhesive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

Pressure sensitive adhesives (PSAs) are well known to one of ordinary skill in the art, and according to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, 2$^{nd}$ Ed., Hanser Gardner Publication, Cincinnati, OH, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. Similarly, an increased need has arisen for pressure sensitive adhesives having improved and versatile adhesion characteristics; in particular with respect to peel forces and shear resistance on various types of difficult to adhere surfaces, such as in particular the so-called low surface energy (LSE) and medium surface energy (MSE) substrates.

In addition to increasing performance requirements with regard to pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful.

In that context, the so-called optically clear pressure sensitive adhesive films (OCA) based on polyacrylates have recently emerged as the most commonly used technical solution for laminating optical members for use in the manufacturing of electronic devices. Exemplary optically clear adhesive films are described e.g. in US-A1-2012/0214936 (Fujita et al.), in US-A1-2013/0251990 (Higashi et al.), in US-A1-2014/0037952 (Shigetomi et al.), and in US-A1-2014/0272201 (Takeda et al.). However, as described in US-A1-2008/0213579 (Lee et al.), the use of polyacrylate-based adhesive formulations is not always ideal, in particular for the manufacturing of electronic devices where the moisture and gas barrier requirements are the most demanding. Moreover, acrylic based adhesive formulations have been shown to be inadequate in reaching low relative permittivity (also referred to as dielectric constant) as well as satisfactory corrosion resistance towards metals, which are of outmost importance in the manufacture of electronic devices.

Rubber-based pressure-sensitive adhesive compositions for use in moisture-permeable waterproof pressure-sensitive adhesive sheets are described e.g. in in US-A1-2015/0056442 (Hayashi) and in US-A1-2015/024196 (Hayashi et al.).

Without contesting the technical advantages associated with the pressure sensitive adhesives known in the art, there is still a need for a durable and cost-effective pressure sensitive adhesive composition providing excellent high temperature adhesion properties, in particular peel and static shear performance, excellent resistance against moisture and water, as well as low relative permittivity. Other advantages of the pressure sensitive adhesives, assemblies and methods of the disclosure will be apparent from the following description.

SUMMARY

According to one aspect, the present disclosure relates to a curable pressure sensitive adhesive composition comprising:

a) a butyl rubber component in an amount greater than 40 wt %;

b) a tackifier in an amount greater than 1 wt %;

c) a multifunctional crosslinking agent comprising at least two nitroso functional groups; and d) optionally, a hydrocarbon plasticizer;

wherein the weight percentages are based on the total weight of the curable pressure sensitive adhesive composition.

In another aspect, the present disclosure is directed to a method for protecting an electronic device or an electronic component from moisture and air permeation, wherein the method comprises the step of using a pressure sensitive adhesive composition as described above.

According to still another aspect, the present disclosure is directed to the use of a pressure sensitive adhesive composition as described above for manufacturing an electronic device.

DETAILED DESCRIPTION

According to first aspect, the present disclosure relates to a curable pressure sensitive adhesive composition comprising:

a) a butyl rubber component in an amount greater than 40 wt %;

b) a tackifier in an amount greater than 1 wt %;

c) a multifunctional crosslinking agent comprising at least two nitroso functional groups; and d) optionally, a hydrocarbon plasticizer;

wherein the weight percentages are based on the total weight of the curable pressure sensitive adhesive composition.

In the context of the present disclosure, it has been surprisingly found that a pressure sensitive adhesive composition as described above is outstandingly suitable for the manufacture of electronic devices, in particular electronic devices comprising capacitive pressure sensors. The pressure sensitive adhesive composition as described herein has been found to serve a dual purpose: providing adequate adhesion between the various electronic device components, and acting as a nonconductive layer in which the low relative permittivity of the adhesive composition prevents electrical charge buildup between the components of the electronic device. Moreover, it has been no less surprisingly been found that the pressure sensitive adhesive composition as described herein is uniquely suited for encapsulating and/or protecting electronic components, in particular capacitive or resistive pressure sensors from moisture and air permeation. Advantageously still, the pressure sensitive adhesive composition as described herein provides excellent corrosion resistance when applied to typical electronic device components, in particular electrically conductive metals such as copper, gold, silver or aluminum, even after prolonged exposure of such materials at 65° C. and 90% relative humidity for more than 500 hours.

In some aspects of the present disclosure, the pressure sensitive adhesive composition for use herein is able to provide and maintain excellent and versatile adhesion characteristics between the various electronic device components even at elevated temperatures (up to 85° C.), with respect to various types of substrate, including the so-called LSE and MSE substrates. In some other aspects of the present disclosure, the pressure sensitive adhesive composition for use herein is characterized by reduced overall VOC level characteristics. In still some advantageous aspects, the pressure sensitive adhesive compositions as described herein are characterized by very low or even substantial absence of perceptible odor.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE, low density polyethylene or LDPE, LLDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, polyurethanes, PUR, TPE, POM, polystyrene, poly(methyl methacrylate) (PMMA), polyethylene terephthalate (PET), clear coat surfaces, in particular clear coats for vehicles like a car or coated surfaces for industrial applications and composite materials like fibre reinforced plastics.

The surface energy is typically determined from contact angle measurements as described, for example, in ASTM D7490-08.

The curable pressure sensitive adhesive composition according to the present disclosure comprises a butyl rubber component.

Any butyl rubber copolymers typically known by those skilled in the art may be used in the context of the present disclosure. Suitable butyl rubber copolymers and components for use herein may be easily identified by those skilled, in the light of the present disclosure.

Suitable butyl rubber copolymers and components for use herein may have various degree of unsaturation, which is typically comprised in a range from 0.1 to 10 mol %.

According to a typical aspect of the present disclosure, the butyl rubber component has a degree of unsaturation from 0.1 to 10 mol %, from 0.1 to 8 mol %, from 0.2 to 8 mol %, from 0.2 to 6 mol %, from 0.3 to 6 mol %, or even from 0.5 to 5 mol %, when measured by the Iodine Index Method as described in Rubber Chemistry and Technology September 1994, Vol. 67, No. 4, pp. 567-581.

According to a beneficial aspect of the present disclosure, the butyl rubber component for use herein is a non-halogenated butyl rubber, in particular a non-chlorinated or a non-brominated butyl rubber.

In an advantageous aspect of the present disclosure, the curable pressure sensitive adhesive composition for use herein comprises a butyl rubber component in an amount greater than 45 wt %, greater than 50 wt %, greater than 55 wt %, greater than 60 wt %, greater than 65 wt %, greater than 70 wt %, or even greater than 75 wt %, wherein the weight percentages are based on the total weight of the curable pressure sensitive adhesive composition.

According to another advantageous aspect of the present disclosure, the curable pressure sensitive adhesive composition for use herein comprises from 42 to 99 wt %, from 42 to 95 wt %, from 42 to 90 wt %, from 42 to 85 wt %, from 45 to 85 wt %, from 50 to 85 wt %, from 51 to 85 wt %, from 52 to 80 wt %, from 52 to 75 wt %, from 55 to 75 wt %, from 55 to 70 wt %, or even from 55 to 65 wt % of a butyl rubber component, wherein the weight percentages are based on the total weight of the curable pressure sensitive adhesive composition.

The curable pressure sensitive adhesive composition according to the present disclosure comprises a tackifier.

Any tackifiers typically known by those skilled in the art may be used in the context of the present disclosure. Suitable tackifiers for use herein may be easily identified by those skilled, in the light of the present disclosure.

Typical examples of tackifiers that can be used herein include, but are not limited to, rosin resins, terpene resins, coumarone-indene resins and petroleum-based hydrocarbon resins.

According to an advantageous aspect of the present disclosure, the tackifier for use in the curable pressure sensitive adhesive composition is selected from the group consisting of rosin resins, in particular rosin acids and their derivatives; terpene resins, in particular polyterpenes and aromatic-modified polyterpene resins; coumarone-indene resins; petroleum-based hydrocarbon resins, in particular C5-based hydrocarbon resins, C9-based hydrocarbon resins, C5/C9-based hydrocarbon resins, and dicyclopentadiene-based resins; and any combinations or mixtures thereof.

According to another advantageous aspect of the present disclosure, the tackifier for use herein is selected from the group consisting of hydrogenated and non-hydrogenated hydrocarbon resins, in particular C5-based hydrocarbon resins, C9-based hydrocarbon resins, C5/C9-based hydrocarbon resins, and any combinations or mixtures thereof.

Suitable tackifying resins may include terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired.

Tackifiers that are hydrocarbon resins can be prepared from various petroleum-based feed stocks. There feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their chemical process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTALEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobil Chemical under the trade designation ESCOREZ, and from Newport Industries under the trade designations NURES and H-REZ (Newport Industries). In the context of the present disclosure, suitable hydrocarbon tackifiers for use herein may be advantageously selected among those C5/C9-based hydrocarbon tackifiers commercially available from Exxon Mobil Chemical under the trade designation ESCOREZ.

In still another beneficial aspect of the disclosure, the tackifier for use herein has a softening point value (RBSP) greater than 70° C., greater than 75° C., greater than 80° C., greater than 85° C., greater than 90° C., greater than 100° C., or even greater than 110° C., when determined according to Test Method ASTM E28-14.

In an advantageous aspect of the present disclosure, the curable pressure sensitive adhesive composition for use herein comprises a tackifier in an amount greater than 1.5 wt %, greater than 2 wt %, greater than 3 wt %, greater than 4 wt %, greater than 5 wt %, greater than 7 wt %, greater than 10 wt %, greater than 15 wt %, greater than 17 wt %, greater than 20 wt %, greater than 25 wt %, greater than 30 wt %, greater than 35 wt %, greater than 40 wt %, or even greater than 45 wt %, wherein the weight percentages are based on the total weight of the curable pressure sensitive adhesive composition.

According to another advantageous aspect of the present disclosure, the curable pressure sensitive adhesive composition for use herein comprises from 1.5 to 55 wt %, from 2 to 55 wt %, from 3 to 55 wt %, from 4 to 55 wt %, from 5 to 55 wt %, from 6 to 55 wt %, from 7 to 55 wt %, from 10 to 55 wt %, from 15 to 55 wt %, from 17 to 50 wt %, from 20 to 50 wt %, from 20 to 45 wt %, from 25 to 45 wt %, from 25 to 40 wt %, from 30 to 40 wt %, or even from 30 to 35 wt % of a tackifier, wherein the weight percentages are based on the total weight of the curable pressure sensitive adhesive composition.

The curable pressure sensitive adhesive composition according to the present disclosure comprises a multifunctional crosslinking agent comprising at least two nitroso functional groups.

Any multifunctional crosslinking agents comprising at least two nitroso functional groups typically known by those skilled in the art may be used in the context of the present disclosure. Suitable multifunctional crosslinking agents for use herein may be easily identified by those skilled, in the light of the present disclosure.

According to an advantageous aspect of the present disclosure, the multifunctional crosslinking agent for use in the curable pressure sensitive adhesive composition is selected from the group consisting of dinitroso and polynitroso compounds, in particular dinitroso compounds.

According to another advantageous aspect of the present disclosure, the multifunctional crosslinking agent for use herein has the following formula:

O═N—R—N═O wherein R is a linear or cyclic alkyl group; linear or cyclic alkylene group; heteroalkyl cyclic group; aryl group or an heteroaryl group.

In a beneficial aspect of the present disclosure, R is an aryl group which is in particular selected from the group consisting of benzene, naphthalene or anthracene. In a preferred aspect of the multifunctional crosslinking agent for use herein, R is benzene.

According to an advantageous aspect of the curable pressure sensitive adhesive composition according to the present disclosure, the multifunctional crosslinking agent for use herein is selected from the group consisting of dinitrosobenzenes and polydinitrosobenzenes, in particular para-dinitrosobenzene and polypara-dinitrosobenzene; and any combinations or mixtures thereof.

According to a particularly advantageous aspect of the curable pressure sensitive adhesive composition according to the present disclosure, the multifunctional crosslinking agent for use herein is selected from the group consisting of para-dinitrosobenzene, polypara-dinitrosobenzene, and any combinations or mixtures thereof.

In an alternative aspect of the curable pressure sensitive adhesive composition according to the present disclosure, the multifunctional crosslinking agent for use herein is obtained in-situ, in particular by oxidation of quinones.

In an advantageous aspect of the present disclosure, the curable pressure sensitive adhesive composition for use herein comprises from 0.1 to 10 wt %, from 0.1 to 8 wt %, from 0.15 to 5 wt %, from 0.15 to 4 wt %, from 0.15 to 3 wt %, from 0.15 to 2.5 wt %, or even from 0.15 to 2 wt % of a multifunctional crosslinking agent comprising at least two nitroso functional groups, wherein the weight percentages are based on the total weight of the curable pressure sensitive adhesive composition.

The curable pressure sensitive adhesive composition according to the present disclosure may optionally comprise a hydrocarbon plasticizer.

Any hydrocarbon plasticizers typically known by those skilled in the art may be used in the context of the present disclosure. Suitable hydrocarbon plasticizers for use herein may be easily identified by those skilled, in the light of the present disclosure.

According to an advantageous aspect of the present disclosure, the hydrocarbon plasticizer for use in the curable pressure sensitive adhesive composition has a weight average molecular weight $M_w$ no greater than 100,000 g/mol, no greater than 80,000 g/mol, no greater than 60,000 g/mol, no greater than 50,000 g/mol, or even no greater than 40,000 g/mol.

The weight average molecular weight $M_w$ of the hydrocarbon plasticizers referred to herein (e.g. the plasticizer) may be determined by any methods known to the skilled person, for example Gel Permeation Chromatography (GPC) also known as Size Exclusion Chromatography (SEC) or by light scattering techniques. Unless otherwise stated, the weight average molecular weight $M_w$ of hydrocarbon plasticizers referred to herein (e.g. the plasticizer) is measured by light scattering according to ASTM D4001-13.

According to another advantageous aspect of the present disclosure, the hydrocarbon plasticizer for use herein has a weight average molecular weight $M_w$ in a range from 500 to 100.000 g/mol, from 1.000 to 90.000 g/mol, from 3.000 to 80.000 g/mol, from 5.000 to 80.000 g/mol, from 8.000 to 80.000 g/mol, from 10.000 to 80.000 g/mol, from 20.000 to 70.000 g/mol, from 25.000 to 65.000 g/mol, from 25.000 to 60.000 g/mol, from 30.000 to 60.000 g/mol, or even from 30.000 to 55.000 g/mol.

In one beneficial aspect of the present disclosure, the hydrocarbon plasticizer for use in the curable pressure sensitive adhesive composition according to the disclosure is selected from the group consisting of polymeric hydrocarbon plasticizers, liquid hydrocarbon plasticizers, in particular hydrocarbon mineral oils.

In another beneficial aspect of the present disclosure, the hydrocarbon plasticizer for use in the curable pressure sensitive adhesive composition according to the disclosure is a polymeric plasticizer selected in particular from the group of polyterpenes, liquid hydrocarbon resins and polyisobutylenes.

In still another beneficial aspect of the present disclosure, the hydrocarbon plasticizer for use herein is a hydrocarbon mineral oil selected in particular from the group of naphthalenic oil and paraffinic oil.

In yet another advantageous aspect of the present disclosure, the curable pressure sensitive adhesive composition comprises a hydrocarbon plasticizer having in particular a softening point value (RBSP) no greater than 25° C. or even no greater than 20° C., when determined according to Test Method ASTM E28-14.

In an advantageous aspect of the present disclosure, the curable pressure sensitive adhesive composition comprises a hydrocarbon plasticizer in an amount no greater than 30 wt %, no greater than 25 wt %, no greater than 20 wt %, no greater than 15 wt %, no greater than 12 wt %, no greater than 10 wt %, or even no greater than 8 wt %, wherein the weight percentages are based on the total weight of the curable pressure sensitive adhesive composition.

According to another advantageous aspect of the present disclosure, the curable pressure sensitive adhesive composition comprises from 1 to 40 wt %, from 2 to 35 wt %, from 2 to 30 wt %, from 3 to 30 wt %, from 3 to 25 wt %, from 3 to 20 wt %, from 5 to 20 wt %, from 5 to 15 wt %, or even from 5 to 10 wt % of a hydrocarbon plasticizer, wherein the weight percentages are based on the total weight of the curable pressure sensitive adhesive composition.

According to a particular aspect, the hydrocarbon plasticizer(s) for use herein, may have a Volatile Organic Compound (VOC) value of less than 1.000 ppm, less than 800 ppm, less than 600 ppm, less than 400 ppm or even less than 200 ppm, when measured by thermogravimetric analysis according to the weight loss test method described in the experimental section.

According to another particular aspect, the polymeric plasticizer(s) for use herein, may have a Volatile Fogging Compound (FOG) value of less than 2.500 ppm, less than 2.000 ppm, less than 1.500 ppm, less than 1.000 ppm, less than 800 ppm, less than 600 ppm, or even less than 500 ppm, when measured by thermogravimetric analysis according to the weight loss test method described in the experimental section.

In some advantageous aspects, the low VOC and overall fogging levels reduction characteristics and performance of the curable pressure sensitive adhesive composition translate into improved resistance of outgassed components to condensation, as well as improved thermal stability of the corresponding pressure sensitive adhesive, which characteristics are particularly suited for electronic applications. In some aspects, the pressure sensitive adhesives as described herein may find particular utility in those applications requiring high temperature resistance and ability to maintain holding power at elevated temperature.

According to one advantageous aspect, the curable pressure sensitive adhesive composition according to the present disclosure further comprises a functionalized adhesion promoter resin, in particular a functionalized polyolefin resin.

In an advantageous aspect, the functionalized polyolefin resin is selected from the group of acrylic modified polyolefin resins, maleic anhydride modified polyolefin resins, acid modified polyolefin resins, and amine modified polyolefin resins. Preferably, the functionalized polyolefin resin is selected from acrylic modified polyolefin resins and acid modified polyolefin resins.

According to typically advantageous aspect of the present disclosure, the curable pressure sensitive adhesive composition comprises from 0.5 to 15 wt %, from 0.5 to 12 wt %, from 1 to 12 wt %, from 1 to 10 wt %, from 2 to 10 wt %, from 2 to 8 wt %, from 3 to 8 wt %, or even from 3 to 6 wt % of a functionalized adhesion promoter resin, based on the total weight of the curable pressure sensitive adhesive composition.

According to one preferred aspect, the curable pressure sensitive adhesive composition according to the present disclosure comprises:

a) a butyl rubber component in an amount greater than 45 wt %, greater than 50 wt %, greater than 55 wt %, greater than 60 wt %, greater than 65 wt %, greater than 70 wt %, or even greater than 75 wt %;

b) a tackifier in an amount greater than 1.5 wt %, greater than 2 wt %, greater than 3 wt %, greater than 4 wt %, greater than 5 wt %, greater than 7 wt %, greater than 10 wt %, greater than 15 wt %, greater than 17 wt %, greater than 20 wt %, greater than 25 wt %, greater than 30 wt %, greater than 35 wt %, greater than 40 wt %, or even greater than 45 wt %;

c) a multifunctional crosslinking agent comprising at least two nitroso functional groups; and d) optionally, a hydrocarbon plasticizer preferably in an amount no greater than 30 wt %, no greater than 25 wt %, no greater than 20 wt %, no greater than 15 wt %, no greater than 12 wt %, no greater than 10 wt %, or even no greater than 8 wt %, wherein the hydrocarbon plasticizer has in particular a softening point value (RBSP) no greater than 25° C. when determined according to Test Method ASTM E28-14;

wherein the weight percentages are based on the total weight of the curable pressure sensitive adhesive composition.

According to another preferred aspect, the curable pressure sensitive adhesive composition according to the present disclosure comprises:

a) from 42 to 99 wt %, from 42 to 95 wt %, from 42 to 90 wt %, from 42 to 85 wt %, from 45 to 85 wt %, from 50 to 85 wt %, from 51 to 85 wt %, from 52 to 80 wt %, from 52 to 75 wt %, from 55 to 75 wt %, from 55 to 70 wt %, or even from 55 to 65 wt % of a butyl rubber component;

b) from 1.5 to 55 wt %, from 2 to 55 wt %, from 3 to 55 wt %, from 4 to 55 wt %, from 5 to 55 wt %, from 6 to 55 wt %, from 7 to 55 wt %, from 10 to 55 wt %, from 15 to 55 wt %, from 17 to 50 wt %, from 20 to 50 wt %, from 20 to 45 wt %, from 25 to 45 wt %, from 25 to 40 wt %, from 30 to 40 wt %, or even from 30 to 35 wt % of a tackifier, and wherein the tackifier has in particular a softening point value (RBSP) greater than 70° C. when determined according to Test Method ASTM E28-14;

c) from 0.1 to 10 wt %, from 0.1 to 8 wt %, from 0.15 to 5 wt %, from 0.15 to 4 wt %, from 0.15 to 3 wt %, from 0.15 to 2.5 wt %, or even from 0.15 to 2 wt % of a multifunctional crosslinking agent comprising at least two nitroso functional groups; and d) optionally, from 1 to 40 wt %, from 2 to 35 wt %, from 2 to 30 wt %, from 3 to 30 wt %, from 3 to 25 wt %, from 3 to 20 wt %, from 5 to 20 wt %, from 5 to 15 wt %, or even from 5 to 10 wt % of a hydrocarbon plasticizer having in particular a softening point value (RBSP) no greater than 25° C. or even no greater than 20° C., when determined according to Test Method ASTM E28-14;

wherein the weight percentages are based on the total weight of the curable pressure sensitive adhesive composition.

As will be apparent to those skilled in the art and in the light of the present disclosure, other additives may optionally be included in the curable pressure sensitive adhesive composition to achieve any desired properties. Such additives include, but are not limited to, further tackifiers, pigments, toughening agents, compatibility agents, fire retardants, antioxidants, polymerization initiators, and various stabilizers. The additives are typically added in amounts sufficient to obtain the desired end properties.

In some aspects, the curable pressure sensitive adhesive composition for use in the present disclosure may further comprise, as an optional ingredient, a filler material. Such fillers may be advantageously used to e.g. increase the mechanical stability of the pressure sensitive adhesive and may also increase its shear and peel force resistance.

Any filler material commonly known to those skilled in the art may be used in the context of the present disclosure. Typical examples of filler material that can be used herein include, but are not limited to, those selected from the group consisting of expanded perlite, microspheres, expandable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a particular aspect of the present disclosure, the curable pressure sensitive adhesive composition may comprise a filler material selected from the group consisting of microspheres, expandable microspheres, preferably pentane filled expandable microspheres, gaseous cavities, glass beads, glass microspheres, glass bubbles and any combinations or mixtures thereof. More typically, the pressure sensitive adhesive may optionally comprise a filler material selected from the group consisting of expandable microspheres, glass bubbles, and any combinations or mixtures thereof.

When present, the filler material for use herein may be used in the pressure sensitive adhesive composition, in any suitable amounts. In some exemplary aspects, the filler material is present in amounts up to 30 parts by weight, up to 25 parts by weight, or even up to 20 parts by weight of the curable pressure sensitive adhesive composition. In some other exemplary aspects, this amount is typically of at least 1 part by weight, or at least 3 parts by weight of the curable pressure sensitive adhesive composition.

Accordingly, in some exemplary aspects, the filler material is present in amounts in a range of from 1 to 20 parts, from 3 to 15 parts by weight, or even from 5 to 13 parts by weight of the curable pressure sensitive adhesive composition. In some other exemplary aspects, the filler material is present in amounts in a range of from 1 to 20 parts, from 2 to 15 parts by weight, or even from 2 to 10 parts by weight of the curable pressure sensitive adhesive composition.

According to a particular and preferred aspect, the curable pressure sensitive adhesive composition of the present disclosure is a solvent-based adhesive.

According to another less preferred aspect, the pressure sensitive adhesive composition for use herein is a hot melt pressure sensitive adhesive. As used herein, a hot melt pressure sensitive adhesive is a polymer or blended polymeric material with a melt viscosity profile such that it can be coated on a substrate or carrier in a thin layer at a process temperature significantly above normal room temperature, but retains useful pressure-sensitive adhesive characteristics at room temperature.

The curable pressure-sensitive adhesive compositions for use in the present disclosure can be manufactured using any methods commonly known in the art. As a way of example, they can be made by dissolving the butyl rubber component, any suitable tackifiers, any suitable hydrocarbon plasticizer(s), and any other additives in a suitable solvent, creating a solvent-based adhesive.

The curable adhesive composition may then be coated onto a substrate (e.g., release liner, tape backing, core, or panel) using conventional means (e.g., knife coating, roll coating, gravure coating, rod coating, curtain coating, spray coating, air knife coating). In some aspects, the adhesive is then dried to remove at least some of the solvent. In some advantageous aspects, substantially all of the solvent is removed.

In some aspects, solvent-based adhesives may be used. In some aspects, such adhesives comprise at least about 20% by weight solvent, in some aspects, at least about 40%, at least about 50%, or even at least about 60% by weight solvent, based on the total weight of the curable pressure sensitive adhesive composition. Any known method of coating and drying solvent based adhesives may be used.

According to the present disclosure, the curable pressure sensitive adhesive composition for use herein is provided with excellent resistance to moisture and water, even after prolonged exposure to high temperature and high relative humidity.

According to an advantageous aspect of the present disclosure, the pressure sensitive adhesive composition for use herein has a water vapor transmission rate (WVTR), no greater than 30 g/m$^2$/day, no greater than 25 g/m$^2$/day, no greater than 22 g/m$^2$/day, no greater than 20 g/m$^2$/day, no greater than 18 g/m$^2$/day, no greater than 15 g/m$^2$/day, no greater than 12 g/m$^2$/day, no greater than 10 g/m$^2$/day, no greater than 8 g/m$^2$/day, when measured on a 20 micrometers thick layer after exposure to a temperature of 40° C. and 100% relative humidity for 24 hours, according to the test method described in the experimental section.

According to another advantageous aspect of the present disclosure, the pressure sensitive adhesive composition for use herein has water uptake no greater than 1, no greater than 0.8, no greater than 0.6, no greater than 0.5, no greater than 0.4, or even no greater than 0.3, when measured after exposure to 60° C. and 95% relative humidity for 120 hours, according to the test method described in the experimental section.

According to the present disclosure still, the curable pressure sensitive adhesive composition for use herein has been found to efficiently act as a nonconductive layer in which the low relative permittivity of the adhesive composition prevents electrical charge buildup between e.g. the components of electronic devices.

According to still another advantageous aspect of the present disclosure, the curable pressure sensitive adhesive composition for use herein has a relative permittivity no greater than 3, no greater than 2.8, no greater than 2.6, no greater than 2.5, or even no greater than 2.4, when measured at an alternating current frequency of from 10 Hz to 100 MHz according to the test method described in the experimental section.

The above-described performance characteristics make the resulting pressure sensitive adhesive composition outstandingly suitable to withstand the relatively elevated temperatures, and optionally high humidity conditions which may be typically experienced in modern electronic devices. As such, the curable pressure sensitive adhesive composition of the present disclosure is outstandingly suitable for the manufacture of electronic devices, in particular electronic devices comprising capacitive pressure sensors.

According to an advantageous aspect, the curable pressure sensitive adhesive composition of the present disclosure is able to provide and maintain excellent and versatile adhesion characteristics, in particular peel strength, at room temperature and elevated temperatures (up to 85° C.), with respect to various types of substrate, including the so-called LSE and MSE substrates.

In a beneficial aspect of the present disclosure, the curable pressure sensitive adhesive composition has a peel adhesion value above 0.50 N/mm, above 0.55 N/mm, above 0.60 N/mm, above 0.65 N/mm, above 0.70 N/mm, above 0.75 N/mm, above 0.80 N/mm, above 0.85 N/mm, above 0.90 N/mm, above 0.95 N/mm, or even above 1.0 N/mm, when measured on polyethylene terephthalate (PET) at 23° C. according to the test method described in the experimental section.

In another beneficial aspect of the present disclosure, the curable pressure sensitive adhesive composition has a peel adhesion value above 0.20 N/mm, above 0.25 N/mm, above 0.30 N/mm, above 0.35 N/mm, above 0.40 N/mm, above 0.45 N/mm, above 0.50 N/mm, above 0.55 N/mm, above 0.60 N/mm, above 0.65 N/mm, above 0.70 N/mm, above 0.75 N/mm, above 0.80 N/mm, above 0.85 N/mm, above 0.90 N/mm, above 0.95 N/mm, or even above 1.0 N/mm, when measured on polyethylene terephthalate at 85° C. according to the test method described in the experimental section.

In another beneficial aspect, the curable pressure sensitive adhesive composition of the present disclosure has a static shear strength value of more than 2000 min, more than 4000 min, more than 6000 min, more than 8000 min, or even more than 10000 min, when measured on stainless steel at 90° C. according to the static shear test method described in the experimental section.

In another aspect, the present disclosure is directed to a cured pressure sensitive adhesive obtainable by curing the curable pressure sensitive adhesive composition as described above.

The curable pressure-sensitive adhesive compositions of the present disclosure may be cured using any curing methods commonly known in the art for curing multifunctional crosslinking agents comprising at least two nitroso functional groups. As a way of example, they curable pressure sensitive adhesive composition can be cured by subjecting the curable pressure sensitive adhesive composition to thermal energy.

According to an advantageous aspect, the cured pressure sensitive adhesive according to the present disclosure is in the form of a layer having a thickness from 5 to 1500 micrometers, from 5 to 1000 micrometers, from 10 to 500 micrometers, from 10 to 300 micrometers, from 15 to 250 micrometers, from 15 to 100 micrometers, or even from 15 to 50 micrometers.

According to another advantageous aspect, the cured pressure sensitive adhesive according to the present disclosure is in the form of a layer having a thickness of less than 1.500 micrometers, less than 1.000 micrometers, less than 800 micrometers, less than 600 micrometers, less than 400 micrometers, less than 200 micrometers, less than 150 micrometers, less than 100 micrometers, less than 80 micrometers, less than 50 micrometers or even less than 30 micrometers.

According to still another advantageous aspect, the cured pressure sensitive adhesive according to the present disclosure is in the form of a layer having a thickness from 20 to 1500 micrometers, from 20 to 1000 micrometers, from 20 to 500 micrometers, from 30 to 400 micrometers, from 30 to 250 micrometers, from 40 to 200 micrometers, or even from 50 to 150 micrometers.

Advantageously still, the cured pressure sensitive adhesive according to the present disclosure is in the form of a layer having a thickness in a range from 100 to 6000 micrometers, from 200 to 4000 micrometers, from 500 to 2000 micrometers, or even from 800 to 1500 micrometers.

The cured pressure sensitive adhesive composition of the present disclosure may take the form of a single layer construction, and consist essentially of a pressure sensitive adhesive layer. Such a single pressure sensitive adhesive layer can be advantageously used as double-sided adhesive tape.

According to another aspect, the cured pressure sensitive adhesive composition of the present disclosure takes the form of a multilayer pressure sensitive adhesive construction comprising a pressure sensitive adhesive composition as described above and a backing layer adjacent to the pressure sensitive adhesive layer. The multilayer pressure sensitive adhesive construction for use herein may have a design or configuration of any suitable kind, depending on its ultimate application and the desired properties, and provided it comprises at least a pressure sensitive adhesive composition as described above.

According to an exemplary aspect, the multilayer pressure sensitive adhesive construction comprises two or more superimposed layers, i.e. the pressure sensitive adhesive layer and adjacent layers such as e.g. a backing layer and/or further pressure sensitive adhesive layers. Such multilayer pressure sensitive adhesive constructions or tapes may be advantageously used as a dual-layer adhesive tape to adhere two objects to one another. In that context, suitable backing layers for use herein may or may not exhibit at least partial pressure sensitive adhesive characteristics.

Accordingly, in one particular aspect, the multilayer pressure sensitive adhesive construction for use herein comprises a backing layer having a first major surface and a second major surface; and a first pressure sensitive adhesive skin layer bonded to the first major surface, wherein the first pressure sensitive adhesive skin layer comprises a pressure sensitive adhesive composition as described above.

In some other executions, the multilayer pressure sensitive adhesive construction further comprises a second pressure sensitive adhesive skin layer bonded to the second major surface. Such a pressure sensitive adhesive construction reflects a three-layer design, in which the backing layer may be sandwiched between e.g. two pressure sensitive adhesive layers.

In some aspects of the multilayer pressure sensitive adhesive construction, the first pressure sensitive adhesive skin layer and the second pressure sensitive adhesive skin layer are the same adhesive, and comprise a pressure sensitive adhesive composition as described above.

In some alternative aspects, the first pressure sensitive adhesive skin layer and the second pressure sensitive adhesive skin layer each independently comprise a pressure sensitive adhesive composition as described above.

In some executions, the multilayer pressure sensitive adhesive construction according to the present disclosure may advantageously be in the form of a skin/core/skin multilayer assembly, wherein the backing layer is the core layer of the multilayer pressure sensitive adhesive construction. As used herein, the term "core" may be used interchangeably with the term "backing".

Any known backing or core may be used herein. Suitable backing layers can be made from plastics (e.g., polypropylene, including biaxially oriented polypropylene, vinyl, polyolefin e.g. polyethylene, polyurethanes, polyurethane acrylates, polyesters such as polyethylene terephthalate), nonwovens (e.g., papers, cloths, nonwoven scrims), metal foils, foams (e.g., polyacrylic, polyethylene, polyurethane, neoprene), and the like.

According to a preferred aspect of the multilayer pressure sensitive adhesive construction for use herein, the backing takes the form of a polymeric foam layer. In the context of the present disclosure, the term "polymeric foam" is meant to designate a material based on a polymer and which material comprises voids, typically in an amount of at least 5% by volume, typically from 10% to 80% by volume or from 10% to 65% by volume. The voids may be obtained by any of the known methods such as cells formed by gas. Alternatively, the voids may result from the incorporation of hollow fillers, such as hollow polymeric particles, hollow glass microspheres, hollow ceramic microspheres. According to another alternative aspect, the voids may result from the incorporation of heat expandable microspheres, preferably pentane filled expandable microspheres. The heat expandable microspheres for use herein may be expanded when the polymer melt passes an extrusion die. Polymer mixtures containing expandable microspheres may also be extruded at temperatures below their expansion temperature and expanded in a later step by exposing the tape to temperatures above the expansion temperature of the microspheres. Alternatively, the voids can result from the decomposition of chemical blowing agents.

A polymeric foam layer typically has a density comprised between 0.30 g/cm$^3$ and 1.5 g/cm$^3$, between 0.35 g/cm$^3$ and 1.10 g/cm$^3$, or even between 0.40 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the polymeric foam layer can be created in any of the known manners described in the art and include the use of a gas or blowing agent and/or incorporation of hollow fillers, such as hollow polymeric particles, hollow glass microspheres, hollow ceramic microspheres or expandable microspheres, preferably pentane filled expandable microspheres, into the composition for the polymeric foam layer.

A polymeric foam layer for use herein has for example a thickness comprised between 100 and 6.000 micrometers, between 200 and 4.000 micrometers, between 500 and 2.000 micrometers, or even between 800 and 1.500 micrometers. As will be apparent to those skilled in the art, in the light of the present description, the preferred thickness of the polymeric foam layer will be dependent on the intended application.

In some aspects the polymeric foam layer has viscoelastic properties at room temperature. In some other aspects, the foam may comprise a thermoplastic foam. In some other aspects, the foam may comprise a thermoset foam. Exemplary foams are also described in, e.g., the *Handbook of Polymer Foams*, David Eaves, editor, published by Shawbury, Shrewsbury, Shropshire, UK: Rapra Technology, 2004.

Multilayer pressure sensitive adhesive constructions comprising a backing in the form of a polymeric foam layer, are particularly advantageous when compared to single-layer pressure sensitive adhesives, in that adhesion (quick adhesion) can be adjusted by the formulation of the pressure sensitive adhesive layer (also commonly referred to as the skin layer), while other properties/requirements of the overall assembly such as application issues, deforming issues and energy distribution may be addressed by appropriate formulation of the polymeric foam layer (also commonly referred to as the core layer).

According to a typical aspect of the multilayer pressure sensitive adhesive construction for use herein, the backing layer comprises a polymer base material selected from the group consisting of rubber-based elastomeric materials, polyacrylates, polyurethanes, polyolefins, polyamides, polyesters, polyethers, polyisobutylene, polystyrenes, polyvinyls, polyvinylpyrrolidone, and any combinations, copolymers or mixtures thereof.

In an advantageous aspect, the backing layer comprises a polymer base material selected from the group consisting of rubber-based elastomeric materials. Advantageously, the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

In some aspects of the multilayer pressure sensitive adhesive construction, the rubber-based elastomeric material is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene-butylene-styrene block copolymers; styrene-ethylene-propylene-styrene block copolymers; styrene-butadiene random copolymers; olefinic polymers and copolymers; ethylene-propylene random copolymers; ethylene-propylene-diene terpolymers, and any combinations or mixtures thereof.

In some other aspects, the rubber-based elastomeric material is selected from the group consisting of styrenic block copolymers, and any combinations or mixtures thereof. In an exemplary aspect of the multilayer pressure sensitive adhesive construction, the rubber-based elastomeric material is selected from the group consisting of styrene-isoprene-styrene block copolymers, styrene-butadiene-styrene block copolymers, styrene-ethylene-butylene-styrene block copolymers, and any combinations or mixtures thereof.

In another exemplary aspect, the rubber-based elastomeric material is selected from the group consisting of styrene-isoprene-styrene block copolymers, styrene-butadiene-styrene block copolymers, and any combinations or mixtures thereof.

In some typical aspects, the backing layer further comprises at least one filler material which is preferably selected from the group consisting of microspheres; expandable microspheres, preferably pentane filled expandable microspheres; gaseous cavities; glass beads; glass microspheres; glass bubbles and any combinations or mixtures thereof; more preferably from the group consisting of expandable microspheres, glass bubbles, and any combinations or mixtures thereof. Preferably, the at least one filler material is selected from the group consisting of expandable microspheres, glassbubbles, and any combinations or mixtures thereof.

In some particular aspects of the multilayer pressure sensitive adhesive construction of the disclosure, a primer layer may be interposed between the pressure sensitive adhesive layer(s) and the backing (or core) layer. In the context of the present disclosure, any primer compositions commonly known to those skilled in the art may be used. Finding appropriate primer compositions is well within the capabilities of those skilled in the art, in the light of the present disclosure. Useful primers for use herein are described e.g. in U.S. Pat. No. 5,677,376 (Groves) and U.S. Pat. No. 5,605,964 (Groves), the content of which is herewith incorporated by reference.

The thickness of the various pressure sensitive adhesive layer(s) and other optional layer(s) comprised in the multilayer pressure sensitive adhesive construction may vary in wide ranges depending on the desired execution and associated properties. By way of example, the thickness can be independently chosen for each layer between 25 and 6.000 micrometers, between 40 and 3.000 micrometers, between 50 and 3.000 micrometers, between 50 and 2.000 micrometers, or even between 50 and 1.500 micrometers.

According to the particular execution wherein the multilayer pressure sensitive adhesive construction takes the form of a skin/core type multilayer pressure sensitive adhesive construction, wherein the backing layer is the core layer of the multilayer pressure sensitive adhesive construction and the pressure sensitive adhesive layer is the skin layer of the multilayer pressure sensitive adhesive construction, it is preferred that the pressure sensitive adhesive layer has a lower thickness compared to the backing/core layer. This is particularly advantageous in executions where the multilayer pressure sensitive adhesive construction takes the form of a polymeric foam pressure sensitive adhesive tape. As a way of example, the thickness of the pressure sensitive adhesive layer may typically be in the range from 20 to 250 micrometers, or even from 40 to 200 micrometers, whereas the thickness of the backing foam layer may typically be in the range from 100 to 6.000 micrometers, from 400 to 3.000 micrometers, or even from 800 to 2.000 micrometers. Such multilayer pressure sensitive adhesive constructions typically exhibit high peel adhesion. Without wishing to be bound by theory, it is believed such high peel adhesion is caused by a stabilizing effect of the relatively thick polymeric foam layer compared to the pressure sensitive adhesive layer.

As will be apparent to those skilled in the art, the multilayer pressure sensitive adhesive construction of the disclosure may comprise various additional layers or components depending on the ultimate function or purpose sought after. Exemplary assemblies may include additional layers selected from optically clear substrates, electrically conductive metal layers, electrically conductive organic layers, semi-conductive inorganic layers, semi-conductive organic layers, organic or inorganic electrically insulated layers, polymeric substrates, barrier films, electroconductive traces, encapsulant layers, backing layers, antireflection films, polarizing films, retardation films, active layers, and functional layers.

According to one particular aspect of the disclosure, the multilayer construction comprises an optically clear substrate. In the context of the present disclosure, a substrate is considered optically clear, if it provides an optical transmission of at least 90% over a wavelength range of from 50 to 110 nm. Optical transmission measurement methods are commonly known in the art. An exemplary method is described in ASTM E903.

In one particular aspect, the optically clear substrate is selected from glass substrates (such as borosilicate or soda lime). In another particular aspect, the optically clear substrate is selected from polymeric substrates. Optically clear polymeric substrates include those made from polyester resins such as polyethylene terephthalate and polyethlene naphthalate, acetate resins, polyethersulfone resins, polycarbonate resins, polyamide resins, polyimide resins, polyolefin resins, (meth)acrylic resins such polymethylmethacrylate resins, polyvinyl chloride resins, polyvinylidene chloride resins, polystyrene resins, polyvinyl alcohol resins, polyarylate resins, cycloolefin reins, and polyphenylene sulfide resins.

According to an exemplary aspect of the disclosure, the multilayer pressure sensitive adhesive construction further comprises metal electrodes, in particular an anode (preferably formed from an electrically conductive material such as indium tin oxide) and a cathode (preferably formed from a low work function metal such as lithium, magnesium, indium, calcium or barium), wherein the at least one organic layer which comprises organic light-emitting diodes is preferably disposed between the cathode and the anode.

According to an advantageous aspect of the disclosure, the multilayer pressure sensitive adhesive construction comprises a low surface energy substrate, preferably adjacent to the pressure sensitive adhesive layer. According to another advantageous aspect of the disclosure, the pressure sensitive adhesive layer is adjacent to a metal electrode, in particular to any of the anode or the cathode. According to still another advantageous aspect of the disclosure, the pressure sensitive adhesive layer is adjacent to the optically clear substrate.

According to an exemplary aspect, the multilayer pressure sensitive adhesive construction comprises an electrically conductive metal layer (such as Copper, Gold, Silver, Aluminum), preferably adjacent to the pressure sensitive adhesive layer. According to another exemplary aspect, the multilayer pressure sensitive adhesive construction comprises an electrically conductive organic layer, preferably adjacent to the pressure sensitive adhesive layer.

According to still another exemplary aspect, the multilayer pressure sensitive adhesive construction comprises a semi-conductive inorganic layer, preferably adjacent to the pressure sensitive adhesive layer. According to yet another exemplary aspect, the multilayer pressure sensitive adhesive construction comprises a semi-conductive organic layer, preferably adjacent to the pressure sensitive adhesive layer.

In a preferred aspect, the multilayer pressure sensitive adhesive construction comprises capacitive or resistive pressure sensors.

According to another aspect, the present disclosure relates to an electronic device comprising a pressure sensitive adhesive composition as described above. The curable and cured pressure sensitive adhesive compositions of the present disclosure may be used in various electronic devices and in combination with various electronic device components.

In a typical aspect of the present disclosure, the electronic device is selected from the group consisting of organic light-emitting device modules, organic light-emitting diodes display panels, capacitive or resistive touch sensors, capacitive or resistive pressure sensors, and touch-sensitive panels.

In an advantageous aspect of the present disclosure, the electronic device is selected from the group consisting of capacitive or resistive touch sensors, and capacitive or resistive pressure sensors.

According to another execution of the present disclosure, the electronic device is selected from the group consisting of organic light-emitting diodes display panels, and touch-sensitive panels.

In a preferred execution, the electronic device of the present disclosure is integrated into an article selected from the group consisting of smartphones, mobile phones, tablet PCs, personal computers, notebook PCs, TV, digital cameras, car navigation systems, smartwatches, media players, activity trackers, hand held electronic devices, and any combinations thereof.

The present disclosure is further directed to a method of manufacturing an electronic device, wherein the method comprises the step of using a pressure sensitive adhesive composition or a multilayer construction as described above.

In a particular aspect of this method, the electronic device comprises at least one electronic component, and the method comprises the step of adhesively bonding the at least one electronic component with the pressure sensitive adhesive composition or the multilayer construction as described above.

In another particular aspect of this method, the electronic device is selected from the group consisting of organic light-emitting device modules, organic light-emitting diodes display panels, capacitive or resistive touch sensors, capacitive or resistive pressure sensors, and touch-sensitive panels. In still another particular aspect of this method, the electronic device is selected from capacitive or resistive touch sensors and capacitive or resistive pressure sensors, and the method comprises the step of applying a pressure sensitive adhesive composition as described above onto the capacitive or resistive touch sensors and capacitive or resistive pressure sensors.

According to another aspect of the present disclosure, it is provided a method for protecting an electronic device or an electronic component as described above from moisture and air permeation, wherein the method comprises the step of using a pressure sensitive adhesive composition or a multilayer construction as described above.

According to another aspect, the present disclosure is directed to the use of a pressure sensitive adhesive composition or a multilayer assembly as described above for protecting an electronic device or an electronic component as described above from moisture and air permeation.

According to still another aspect, the present disclosure is directed to the use of a pressure sensitive adhesive composition or a multilayer assembly as described above for manufacturing an electronic device, in particular capacitive or resistive touch sensors and capacitive or resistive pressure sensors.

Item 1 is curable pressure sensitive adhesive composition comprising:

a) a butyl rubber component in an amount greater than 40 wt %;
b) a tackifier in an amount greater than 1 wt %;
c) a multifunctional crosslinking agent comprising at least two nitroso functional groups; and
d) optionally, a hydrocarbon plasticizer;

wherein the weight percentages are based on the total weight of the curable pressure sensitive adhesive composition.

Item 2 is a curable pressure sensitive adhesive composition according to item 1, which comprises:

a) a butyl rubber component in an amount greater than 45 wt %, greater than 50 wt %, greater than 55 wt %, greater than 60 wt %, greater than 65 wt %, greater than 70 wt %, or even greater than 75 wt %;
b) a tackifier in an amount greater than 1.5 wt %, greater than 2 wt %, greater than 3 wt %, greater than 4 wt %, greater than 5 wt %, greater than 7 wt %, greater than 10 wt %, greater than 15 wt %, greater than 17 wt %, greater than 20 wt %, greater than 25 wt %, greater than 30 wt %, greater than 35 wt %, greater than 40 wt %, or even greater than 45 wt %;
c) a multifunctional crosslinking agent comprising at least two nitroso functional groups; and
d) optionally, a hydrocarbon plasticizer preferably in an amount no greater than 30 wt %, no greater than 25 wt %, no greater than 20 wt %, no greater than 15 wt %, no greater than 12 wt %, no greater than 10 wt %, or even no greater than 8 wt %, wherein the hydrocarbon plasticizer has in particular a softening point value (RBSP) no greater than 25° C. when determined according to Test Method ASTM E28-14;

wherein the weight percentages are based on the total weight of the curable pressure sensitive adhesive composition.

Item 3 is a curable pressure sensitive adhesive composition according to any of item 1 or 2, which comprises:

a) from 42 to 99 wt %, from 42 to 95 wt %, from 42 to 90 wt %, from 42 to 85 wt %, from 45 to 85 wt %, from 50 to 85 wt %, from 51 to 85 wt %, from 52 to 80 wt %, from 52 to 75 wt %, from 55 to 75 wt %, from 55 to 70 wt %, or even from 55 to 65 wt % of a butyl rubber component;
b) from 1.5 to 55 wt %, from 2 to 55 wt %, from 3 to 55 wt %, from 4 to 55 wt %, from 5 to 55 wt %, from 6 to 55 wt %, from 7 to 55 wt %, from 10 to 55 wt %, from 15 to 55 wt %, from 17 to 50 wt %, from 20 to 50 wt %, from 20 to 45 wt %, from 25 to 45 wt %, from 25 to 40 wt %, from 30 to 40 wt %, or even from 30 to 35 wt % of a tackifier, and wherein the tackifier has in particular a softening point value (RBSP) greater than 70° C. when determined according to Test Method ASTM E28-14;
c) from 0.1 to 10 wt %, from 0.1 to 8 wt %, from 0.15 to 5 wt %, from 0.15 to 4 wt %, from 0.15 to 3 wt %, from 0.15 to 2.5 wt %, or even from 0.15 to 2 wt % of a multifunctional crosslinking agent comprising at least two nitroso functional groups; and
d) optionally, from 1 to 40 wt %, from 2 to 35 wt %, from 2 to 30 wt %, from 3 to 30 wt %, from 3 to 25 wt %, from 3 to 20 wt %, from 5 to 20 wt %, from 5 to 15 wt %, or even from 5 to 10 wt % of a hydrocarbon plasticizer having in particular a softening point value (RBSP) no greater than 25° C. or even no greater than 20° C., when determined according to Test Method ASTM E28-14;

wherein the weight percentages are based on the total weight of the curable pressure sensitive adhesive composition.

Item 4 is a curable pressure sensitive adhesive composition according to any of the preceding items, wherein the butyl rubber component has a degree of unsaturation from 0.1 to 10 mol %, from 0.1 to 8 mol %, from 0.2 to 8 mol %, from 0.2 to 6 mol %, from 0.3 to 6 mol %, or even from 0.5 to 5 mol %, when measured by the Iodine Index Method as described in Rubber Chemistry and Technology September 1994, Vol. 67, No. 4, pp. 567-581.

Item 5 is a curable pressure sensitive adhesive composition according to any of the preceding items, wherein the butyl rubber component is a non-halogenated butyl rubber.

Item 6 is curable pressure sensitive adhesive composition according to any of the preceding items, wherein the tackifier is selected from the group consisting of rosin resins, in particular rosin acids and their derivatives; terpene resins, in particular polyterpenes and aromatic-modified polyterpene resins; coumarone-indene resins; petroleum-based hydrocarbon resins, in particular C5-based hydrocarbon resins, C9-based hydrocarbon resins, C5/C9-based hydrocarbon resins, and dicyclopentadiene-based resins; and any combinations or mixtures thereof.

Item 7 is a curable pressure sensitive adhesive composition according to any of the preceding items, wherein the tackifier is selected from the group consisting of hydrogenated and non-hydrogenated hydrocarbon resins, in particular C5-based hydrocarbon resins, C9-based hydrocarbon resins, C5/C9-based hydrocarbon resins, and any combinations or mixtures thereof.

Item 8 is a curable pressure sensitive adhesive composition according to any of the preceding items, wherein the tackifier has in particular a softening point value (RBSP) greater than 75° C., greater than 80° C., greater than 85° C., greater than 90° C., greater than 100° C., or even greater than 110° C., when determined according to Test Method ASTM E28-14.

Item 9 is a curable pressure sensitive adhesive composition according to any of the preceding items, wherein the multifunctional crosslinking agent comprising at least two nitroso functional groups is selected from the group consisting of dinitroso and polynitroso compounds, in particular dinitroso compounds.

Item 10 is a curable pressure sensitive adhesive composition according to any of the preceding items, wherein the multifunctional crosslinking agent comprising at least two nitroso functional groups has the following formula:

$$O{=}N{-}R{-}N{=}O$$

wherein R is a linear or cyclic alkyl group; linear or cyclic alkylene group; heteroalkyl cyclic group; aryl group or an heteroaryl group.

Item 11 is a curable pressure sensitive adhesive composition according to item 10, wherein R is an aryl group which is in particular selected from the group consisting of benzene, naphthalene or anthracene.

Item 12 is a curable pressure sensitive adhesive composition according to any of item 10 or 11, wherein R is benzene.

Item 13 is a curable pressure sensitive adhesive composition according to any of the preceding items, wherein the multifunctional crosslinking agent comprising at least two nitroso functional groups is selected from the group consisting of dinitrosobenzenes and polydinitrosobenzenes, in particular para-dinitrosobenzene and polypara-dinitrosobenzene; and any combinations or mixtures thereof.

Item 14 is a curable pressure sensitive adhesive composition according to any of the preceding items, wherein the multifunctional crosslinking agent comprising at least two nitroso functional groups is selected from the group consisting of para-dinitrosobenzene, polypara-dinitrosobenzene, and any combinations or mixtures thereof.

Item 15 is a curable pressure sensitive adhesive composition according to any of the preceding items, wherein the multifunctional crosslinking agent comprising at least two nitroso functional groups is obtained in-situ, in particular by oxidation of quinones.

Item 16 is a curable pressure sensitive adhesive composition according to any of the preceding items, wherein the hydrocarbon plasticizer has a weight average molecular weight $M_w$ no greater than 100,000 g/mol, no greater than 80,000 g/mol, no greater than 60,000 g/mol, no greater than 50,000 g/mol, or even no greater than 40,000 g/mol.

Item 17 is a curable pressure sensitive adhesive composition according to any of the preceding items, wherein the hydrocarbon plasticizer has a weight average molecular weight $M_w$ in a range from 500 to 100.000 g/mol, from 1.000 to 90.000 g/mol, from 3.000 to 80.000 g/mol, from 5.000 to 80.000 g/mol, from 8.000 to 80.000 g/mol, from 10.000 to 80.000 g/mol, from 20.000 to 70.000 g/mol, from 25.000 to 65.000 g/mol, from 25.000 to 60.000 g/mol, from 30.000 to 60.000 g/mol, or even from 30.000 to 55.000 g/mol.

Item 18 is a curable pressure sensitive adhesive composition according to any of the preceding items, wherein the hydrocarbon plasticizer is selected from the group consisting of polymeric hydrocarbon plasticizers, liquid hydrocarbon plasticizers, in particular hydrocarbon mineral oils.

Item 19 is a curable pressure sensitive adhesive composition according to any of the preceding items, wherein the hydrocarbon plasticizer is a polymeric plasticizer selected in particular from the group of polyterpenes, liquid hydrocarbon resins and polyisobutylenes.

Item 20 is a curable pressure sensitive adhesive composition according to any of the preceding items, wherein the hydrocarbon plasticizer is a hydrocarbon mineral oil selected in particular from the group of naphthalenic oil and paraffinic oil.

Item 21 is a curable pressure sensitive adhesive composition according to any of the preceding items, which further comprises a functionalized adhesion promoter resin, in particular a functionalized polyolefin resin preferably selected from the group of acrylic modified polyolefin resins, maleic anhydride modified polyolefin resins, acid modified polyolefin resins, and amine modified polyolefin resins.

Item 22 is a curable pressure sensitive adhesive composition according to item 21, which comprises from 0.5 to 15 wt %, from 0.5 to 12 wt %, from 1 to 12 wt %, from 1 to 10 wt %, from 2 to 10 wt %, from 2 to 8 wt %, from 3 to 8 wt %, or even from 3 to 6 wt % of a functionalized adhesion promoter resin, based on the total weight of the curable pressure sensitive adhesive composition.

Item 23 is a curable pressure sensitive adhesive composition according to any of the preceding items in the form of a single layer, which has a water vapor transmission rate (WVTR), no greater than 30 $g/m^2$/day, no greater than 25 $g/m^2$/day, no greater than 22 $g/m^2$/day, no greater than 20 $g/m^2$/day, no greater than 18 $g/m^2$/day, no greater than 15 $g/m^2$/day, no greater than 12 $g/m^2$/day, no greater than 10 $g/m^2$/day, no greater than 8 $g/m^2$/day, when measured on a 20 micrometers thick layer after exposure to a temperature of 40° C. and 100% relative humidity for 24 hours, according to the test method described in the experimental section.

Item 24 is a curable pressure sensitive adhesive composition according to any of the preceding items, which has a water uptake no greater than 1, no greater than 0.8, no greater than 0.6, no greater than 0.5, no greater than 0.4, or even no greater than 0.3, when measured after exposure to 60° C. and 95% relative humidity for 120 hours, according to the test method described in the experimental section.

Item 25 is a curable pressure sensitive adhesive composition according to any of the preceding items, which has a relative permittivity no greater than 3, no greater than 2.8, no greater than 2.6, no greater than 2.5, or even no greater than 2.4, when measured at an alternating current frequency of from 10 Hz to 100 MHz according to the test method described in the experimental section.

Item 26 is a curable pressure sensitive adhesive composition according to any of the preceding items, which has a peel adhesion value above 0.50 N/mm, above 0.55 N/mm, above 0.60 N/mm, above 0.65 N/mm, above 0.70 N/mm, above 0.75 N/mm, above 0.80 N/mm, above 0.85 N/mm, above 0.90 N/mm, above 0.95 N/mm, or even above 1.0 N/mm, when measured on polyethylene terephthalate at 23° C. according to the test method described in the experimental section.

Item 27 is a curable pressure sensitive adhesive composition according to any of the preceding items, which has a peel adhesion value above 0.50 N/mm, above 0.55 N/mm, above 0.60 N/mm, above 0.65 N/mm, above 0.70 N/mm, above 0.75 N/mm, above 0.80 N/mm, above 0.85 N/mm, above 0.90 N/mm, above 0.95 N/mm, or even above 1.0 N/mm, when measured on polyethylene terephthalate at 23° C. according to the test method described in the experimental section.

Item 28 is a curable pressure sensitive adhesive composition according to any of the preceding items, which has a static shear strength value of more than 2000 min, more than 4000 min, more than 6000 min, more than 8000 min, or even more than 10000 min, when measured on stainless steel at 90° C. according to the static shear test method described in the experimental section.

Item 29 is a cured pressure sensitive adhesive obtainable by curing the curable pressure sensitive adhesive composition according to any of the preceding items, wherein the curing step is preferably performed by subjecting the curable pressure sensitive adhesive composition to thermal energy.

Item 30 is a cured pressure sensitive adhesive according to item 29, which is in the form of a layer having a thickness from 5 to 1500 micrometers, from 5 to 1000 micrometers, from 10 to 500 micrometers, from 10 to 300 micrometers, from 15 to 250 micrometers, from 15 to 100 micrometers, or even from 15 to 50 micrometers.

Item 31 is a cured pressure sensitive adhesive according to item 29, which is in the form of a layer having a thickness of less than 1.500 micrometers, less than 1.000 micrometers, less than 800 micrometers, less than 600 micrometers, less than 400 micrometers, less than 200 micrometers, less than 150 micrometers, less than 100 micrometers, less than 80 micrometers, less than 50 micrometers or even less than 30 micrometers.

Item 32 is a cured pressure sensitive adhesive according to item 29, which is in the form of a layer having a thickness from 20 to 1500 micrometers, from 20 to 1000 micrometers, from 20 to 500 micrometers, from 30 to 400 micrometers, from 30 to 250 micrometers, from 40 to 200 micrometers, or even from 50 to 150 micrometers.

Item 33 is a cured pressure sensitive adhesive according to item 29, which is in the form of a layer having a thickness in a range from 100 to 6000 micrometers, from 200 to 4000 micrometers, from 500 to 2000 micrometers, or even from 800 to 1500 micrometers.

Item 34 is a multilayer pressure sensitive adhesive construction comprising a cured pressure sensitive adhesive according to any of items 29 to 33 and a backing layer adjacent to the pressure sensitive adhesive layer.

Item 35 is a multilayer pressure sensitive adhesive construction according to item 34, wherein the backing layer has a first major surface and a second major surface; and wherein the multilayer pressure sensitive adhesive construction further comprises a first pressure sensitive adhesive skin layer bonded to the first major surface of the backing layer, wherein the first pressure sensitive adhesive skin layer is as described in any of items 29 to 33.

Item 36 is a multilayer pressure sensitive adhesive construction according to item 35, which further comprises a second pressure sensitive adhesive skin layer bonded to the second major surface of the backing layer.

Item 37 is a multilayer pressure sensitive adhesive construction according to any of item 35 or 36, wherein the first pressure sensitive adhesive skin layer and the second pressure sensitive adhesive layer are the same adhesive.

Item 38 is a multilayer pressure sensitive adhesive construction according to any of item 35 or 36, wherein the first pressure sensitive adhesive skin layer and the second pressure sensitive adhesive layer each independently are as described in any of items 29 to 33.

Item 39 is a multilayer pressure sensitive adhesive construction according to any of items 36 to 38, which is in the form of a skin/core/skin multilayer pressure sensitive adhesive construction, wherein the backing layer is the core layer of the multilayer pressure sensitive adhesive construction.

Item 40 is a multilayer pressure sensitive adhesive construction according to any of items 34 to 39, wherein the backing layer has a composition as described in any of items 1 to 28.

Item 41 is a multilayer pressure sensitive adhesive construction according to any of items 34 to 40, wherein the backing layer is a foam backing.

Item 42 is a multilayer pressure sensitive adhesive construction according to any of items 34 to 41, wherein the backing layer comprises a polymer base material selected from the group consisting of rubber-based elastomeric materials, polyacrylates, polyurethanes, polyolefins, polyamines, polyamides, polyesters, polyethers, polyisobutylene, polystyrenes, polyvinyls, polyvinylpyrrolidone, and any combinations, copolymers or mixtures thereof.

Item 43 is a multilayer pressure sensitive adhesive construction according to item 42, wherein the backing layer comprises a polymer base material selected from the group consisting of rubber-based elastomeric materials.

Item 44 is a multilayer pressure sensitive adhesive construction according to item 43, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

Item 45 is a multilayer pressure sensitive adhesive construction according to any of items 34 to 44, wherein the backing layer further comprises at least one filler material which is preferably selected from the group consisting of microspheres; expandable microspheres, preferably pentane filled expandable microspheres; gaseous cavities; glass beads; glass microspheres; glass bubbles and any combinations or mixtures thereof; more preferably from the group consisting of expandable microspheres, glass bubbles, and any combinations or mixtures thereof.

Item 46 is an electronic device comprising a pressure sensitive adhesive composition according to any of items 1 to 33.

Item 47 is an electronic device according to item 44, which is selected from the group consisting of organic light-emitting device modules, organic light-emitting diodes display panels, capacitive or resistive touch sensors, capacitive or resistive pressure sensors, and touch-sensitive panels.

Item 48 is an electronic device according to item 46 or 47, which is selected from the group consisting of capacitive or resistive touch sensors, and capacitive or resistive pressure sensors.

Item 49 is an electronic device according to any of items 46 to 48, which is integrated into an article selected from the group consisting of smartphones, mobile phones, tablet PCs, personal computers, notebook PCs, TV, digital cameras, car navigation systems, smartwatches, media players, activity trackers, hand held electronic devices, and any combinations thereof.

Item 50 is a method of manufacturing an electronic device, wherein the method comprises the step of using a pressure sensitive adhesive composition or a multilayer construction as described in any of items 1 to 43.

Item 51 is a method according to item 50, wherein the electronic device comprises at least one electronic component, and wherein the method comprises the step of adhesively bonding the at least one electronic component with the pressure sensitive adhesive composition or the multilayer construction.

Item 52 is a method according to any of item 50 or 51, wherein the electronic device is selected from the group consisting of organic light-emitting device modules, organic light-emitting diodes display panels, capacitive or resistive touch sensors, capacitive or resistive pressure sensors, and touch-sensitive panels.

Item 53 is a method for protecting an electronic device or an electronic component as described in any of items 46 to 49 from moisture and air permeation, wherein the method comprises the step of using a pressure sensitive adhesive composition or a multilayer construction as described in any of items 1 to 45.

Item 54 is the use of a pressure sensitive adhesive composition or a multilayer construction as described in any of items 1 to 45 for protecting an electronic device or an electronic component as described in any of items 46 to 49 from moisture and air permeation.

Item 55 is the use of a pressure sensitive adhesive composition or a multilayer construction as described in any of items 1 to 44 for manufacturing an electronic device.

EXAMPLES

The present disclosure is further illustrated by the following examples. These examples are merely for illustrative purposes only and are not meant to be limiting on the scope of the appended claims.

Test Methods Applied:

Water Vapor Transmission Rate

Water Vapor Transmission Rate is measured using a setup from Mocon: Permatran-W 1/50 G Testing Instrument. The test conditions are 40° C. and 100% RH (relative humidity).

Relative Permittivity

The relative permittivity of the pressure sensitive adhesive compositions are measured using a broadband Novocontrol Dielectric Spectrometer according to Test Method ASTM D150, at an alternating current frequency of 100 kHz. The samples are laminated together to give thin sheets of thicknesses approximately 1 mm and diameters of 40 mm.

Water Uptake

The water uptake (or water absorption) of the pressure sensitive adhesive compositions are measured on a Rubotherm GHP-150 gravimetric balance at 65° C. and 90% relative humidity, typically after exposure to these conditions for 120 hours. The Rubotherm GHP-150 is a high pressure gravimetric adsorption instrument capable of measuring adsorption and desorption isotherms with solid samples using a variety of gases or vapors. The balance has a 25 gram maximum capacity with a resolution of 10 μg. A maximum pressure of ~150 bars can be achieved and the vacuum system has a standard range down to 10-3 bar. For the most common experimental temperatures, control to within ±0.5° C. is achievable. The pressure sensitive adhesive samples are placed on a piece of aluminum foil. The foil is then rolled and holes are poked into it so that vapor could access the sample from multiple entry points. The foil is then inserted into a wire mesh sample bucket. Approximately 0.7 g of sample are used for each experiment. After drying, the pressure sensitive adhesive samples are exposed to approximately 90% relative humidity water vapor and the weight uptake is measured. The samples are dried on the unit for approximately two hours under dynamic vacuum prior to experimentation.

180° Peel Test at RT or 85° C. and 300 mm/min (FINAT Test Method No. 2, 8th Edition 2009)

The single layer pressure sensitive adhesive films are laminated prior to testing on a 50 μm thick PET backing (commercially available as Hostaphan RN 50). The hereby obtained pressure sensitive adhesive strips are cut out in the machine direction from the pressure sensitive adhesive film sample material to provide test strips with a width of 25.4 mm and a length >300 mm. The PET substrates are used as received after removing the protection film. Stainless steel panels are cleaned with isopropanol/water 50:50 mixture prior to use. For test sample preparation the liner is first removed from the adhesive side and the tape was applied to the clean test panel using light finger pressure. Next, the test samples are rolled four times with a standard FINAT test roller (weight 2.0 kg) at a speed of approximately 10 mm per second to obtain intimate contact between the adhesive and the surface. After applying the pressure sensitive adhesive assembly strips to the test panel, the test samples are allowed to dwell for 24 h at ambient room temperature (23° C.+/−2° C., 50% relative humidity+/−5%) prior to testing at 85° C. or room temperature.

For 180° peel testing the test panel is clamped in the lower movable jaw of a Zwick tensile tester (Model Z020 commercially available from Zwick/Roell GmbH, Ulm, Germany). The pressure sensitive adhesive film strips are folded back at an angle of 180° and the free end is clamped in the upper jaw of the tensile tester in a configuration commonly utilized for 180° measurements. The tensile tester is set at 300 mm per minute jaw separation rate. Test results are expressed in Newton per mm (N/mm). The quoted peel values are the average of two 180°-peel measurements.

Static Shear Test at 90° C. with 500 g (FINAT Test Method No. 8, 8th Edition 2009)

The test is carried out at 90° C. The pressure sensitive adhesive film is laminated on a 50 μm thick PET backing (commercially available as Hostaphan RN50). Test specimens are cut out of the sample material having a dimension of 12.7 mm by 175 mm. The liner is then removed and the adhesive strips are adhered onto stainless steel plates (commercially available from Rocholl GmbH) with an overlap of 12.7×25.4 mm. A loop is prepared at the end of the test strip in order to hold the specified weight. Next, the test samples are rolled down four times with a standard FINAT test roller (weight 2 kg) at a speed of approximately 10 mm per second to obtain intimate contact between the adhesive mass and the surface. After applying the pressure sensitive adhesive assembly strips to the test panel, the test samples are allowed to dwell for 24 hours at ambient room temperature (23±2° C., 50±5% relative humidity) prior to testing.

Each sample is then placed into a vertical shear-stand (+2° disposition) at 90° C. provided with automatic time logging. After 10 minutes dwell time in the oven, a 500 g weight is hung into the loop. The time until failure is measured and recorded in minutes. Target value is 10,000 minutes. Two samples are measured for each construction. A recorded time of ">10000" indicates that the adhesive did not fail after 10.000 min.

Metal Foil Corrosion Test

The single layer pressure sensitive adhesive films are laminated prior to testing on a 50 μm thick PET backing (commercially available as Hostaphan RN 50). The hereby obtained pressure sensitive adhesive strips are cut out in the machine direction from the pressure sensitive adhesive film sample material to provide test strips with a width of approximately 70 mm and a length of approximately 140 mm. The pressure sensitive adhesive strips are then laminated to a copper foil having a slightly greater dimension, and placed in an oven at 65° C. and 90% relative humidity for 500 hours. Corrosion is visually assessed by visually observation of any color changes or other indication of corrosion.

Ring and Ball Test Method

The softening point value of the tackifier and the hydrocarbon plasticizer are determined according to Test Method ASTM E28-14.

TGA Test Method

The TGA (Thermogravimetric Analysis) measurements are performed with a Q5000IR equipment from Texas Instruments. The samples are weighed in a platinum pan and placed with an auto sampler in the oven of the apparatus. The nitrogen flow through the oven is 25 mL/min, the nitrogen flow through the balance is 10 mL/min. The temperature is equilibrated at 30° C. and is held for 15 minutes. Then the temperature is increased to 90° C. with a ramp of 60° C./min. The 90° C. are then held for 30 minutes. In a next step, the temperature is increased to 120° C. with a ramp of 60° C./min. The 120° C. are held for 60 minutes. The weight losses during 30 minutes at 90° C. (VOC analysis) and during 60 minutes at 120° C. (FOG analysis) are recorded.

The test is then completed by increasing the temperature to 800° C. with a ramp of 10° C./min. Then, the temperature is equilibrated at 600° C., the oven is purged with air and the temperature is increased to 900° C. with a ramp of 10° C./min.

Thermal Desorption Analysis of Organic Emissions According to VDA Test Method 278

VDA method 278 is a test method used for the determination of organic emissions from non-metallic trim components used to manufacture the interior of motor vehicles (VDA stands for "Verband der Automobilindustrie", the German Association of Automobilists). The method classifies the emitted organic compounds into two groups:

- VOC value—the sum of volatile and semi-volatile compounds up to n-$C_{25}$ and
- FOG value—the sum of the semi-volatile and heavy compounds from n-$C_{14}$ to n-$C_{32}$ For measuring the VOC and FOG values, adhesive samples of 30±5 mg are weighed directly into empty glass sample tubes. The volatile and semi-volatile organic compounds are extracted from the samples into the gas stream and are then re-focused onto a secondary trap prior to injection into a GC for analysis. An automated thermal desorber (Markes International Ultra-UNITY system) is hereby used for the VDA 278 testing.

The Test Method Comprises Two Extraction Stages:

VOC analysis, which involves desorbing the sample at 90° C. for 30 minutes to extract VOC's up to n-$C_{25}$. This is followed by a semi-quantitative analysis of each compound as μg toluene equivalents per gram of sample.

involves desorbing the sample at 120° C. for 60 minutes to extract semi-volatile compounds ranging from n-$C_{14}$ to n-$C_{32}$. This is followed by semi-quantitative analysis of each compound as μg hexadecane equivalents per gram of sample.

The VOC values expressed are the average of two measurements per sample. The higher value of the measurements is indicated as the result, as described in the VDA278 test method. In order to determine the FOG value, the second sample is retained in the desorption tube after the VOC analysis and reheated to 120° C. for 60 minutes.

Shear Adhesion Failure Temperature (SAFT)

The sample preparation for SAFT tests is as described above for the static shear test at 70° C. or 90° C. The test specimen are hung in a programmable air forced oven and a weight of 500 g is hung into the loop. The starting temperature is 23° C. and the temperature is increased by 10° C. every hour until reaching 130° C. The temperature at which the weight falls is recorded.

Test Substrates Used for Testing:

The pressure sensitive adhesive films according to the present disclosure are tested for their adhesive properties on the following substrates:

PET: polyethylene terephthalate test panels, available from Rocholl GmbH, Aglatershausen, Germany.

Stainless steel test plates, available from Rocholl GmbH, Aglatershausen, Germany.

Prior to testing, the stainless steel substrates are cleaned as follows:

The panels are cleaned first with a dry tissue applied with gentle force to remove any residuals/waxy compounds on the surface and then cleaned with a mixture of isopropyl alcohol:distilled water (1:1) and dried with a tissue.

The PET test panels are used as received after removing the protective film.

Raw Materials and Products Used:

The raw materials and commercial adhesive tapes used are summarized in Table 1 below.

TABLE 1

| Name | Description | Supplier |
|---|---|---|
| RB402 | Butyl rubber with a Mooney Viscosity ML (1 + 8) 125° C. of 33 MU and an unsaturation of 2.25% | Arlanxeo |
| Arkon P125 | Hydrocarbon tackifier | Arakawa |
| Escorez 1102 | Hydrocarbon tackifier | ExxonMobil |
| Regalite R1010 | Liquid hydrocarbon resin (plasticizer) | Eastman |
| Sylvares TR A25 | Liquid polyterpene plasticizer | Kraton |
| Glissopal 1000 | Liquid polyisobutylene plasticizer | BASF |

TABLE 1-continued

| Name | Description | Supplier |
|---|---|---|
| Oppanol B100 | Polyisobutylene rubber with an average viscosity molecular weight Mv of 1,100,000 g/mol. | BASF |
| PPDN30DX | Polyparadinitrosobenzene (30% dispersion in xylene) | Safic-Alcan |
| Auroren 350S | Acrylic Modified Polyolefin Adhesion Promoter Resin | Nippon Paper Industries Co., Ltd. |
| Tinuvin 928 | UV blocker | BASF |
| Irganox 1010 | Antioxidant | BASF |
| 467MP | Acrylic Pressure Sensitive Adhesive transfer tape. Thickness 50 micrometers. | 3M Company |
| Butyl acetate | Solvent | Sigma-Aldrich |
| n-Heptane | Solvent | Sigma-Aldrich |

Preparation of the Pressure Sensitive Adhesive Compositions ("PSAs"):

The raw materials as indicated in Table 1 are weighed in a glass jar except for the crosslinking agent. 125 g of n-heptane and 125 g of butyl acetate are then added (except for Ex.7 where 150 g of n-heptane and 150 g of butyl acetate are added). The jar is covered with a metal lid and placed on rotating rolls. The mixture is then rolled for 5 days until all the components are dissolved. 24 hours prior to coating, the crosslinking agent is added to the PSA solutions and is further dispersed for about 1 min at 14.000 rpm using a disperser. The solutions are coated onto a siliconized liner using a solvent coater at a web speed of 2 m/min (except for Ex. 5 where the web speed is set at 1 m/min). The wet film is approximately 110 micrometers thick (except for Ex.7 where the film has a thickness of 130 micrometers). The solvent coater has five temperature zones with the following temperature profile: zone 1:60° C., zone 2: 80° C.; zone 3: 90° C., zone 4: 110° C. and zone 5: 130° C. (except for Ex. 5 where zone 4 is set at 160° C. and zone 5 is set at 160° C.). The resulting dry PSA coating has a coating weight of about 20 g/m$^2$. For allowing adhesive testing, the pressure sensitive adhesive layers are laminated onto a PET backing (commercially available as Hostaphan RN 50) having a film thickness of 50 μm, resulting in a PSA tape comprising a PET backing.

Examples of Pressure Sensitive Adhesive Compositions (Examples 1 to 7) and Comparative Examples CE-1 and CE-2

Pressure sensitive adhesive compositions of examples 1 to 7 are based on the combination of a butyl rubber component, a tackifier, a multifunctional crosslinking agent comprising at least two nitroso functional groups and optionally, a hydrocarbon plasticizer. The composition of example 6 further comprises a functionalized adhesion promoter resin. Comparative examples CE-1 and CE-2 have an amount of butyl rubber component no greater than 40 wt %.

TABLE 2

| | CE-1 (parts) | CE-2 (parts) | Ex.1 (parts) | Ex.2 (parts) | Ex.3 (parts) |
|---|---|---|---|---|---|
| RB402 | 31.8 | 40 | 65 | 65 | 50 |
| Arkon P125 | — | 40 | 35 | 27.5 | 42.5 |
| Escorez 1102 | 18.7 | — | — | — | — |
| Regalite R1010 | — | 20 | — | — | 7.5 |
| Sylvares TR A25 | — | — | — | 7.5 | — |
| Glissopal 1000 | 43.1 | — | — | — | — |
| Oppanol B100 | 5.6 | — | — | — | — |

TABLE 2-continued

| | | | | | |
|---|---|---|---|---|---|
| PPDN30DX | 0.7 | 1 | 1 | 1 | 1 |
| Auroren 350S | — | — | — | — | — |
| Tinuvin 928 | — | — | 1.5 | 1.5 | 1.5 |
| Irganox 1010 | — | — | 1.35 | 0.35 | 1.35 |

| | Ex.4 (parts) | Ex.5 (parts) | Ex.6 (parts) | Ex.7 (parts) |
|---|---|---|---|---|
| RB402 | 75 | 60 | 65 | 98 |
| Arkon P125 | 17.5 | 32.5 | 27.5 | 2 |
| Escorez 1102 | — | — | — | — |
| Regalite R1010 | 7.5 | 7.5 | — | — |
| Sylvares TR A25 | — | — | 7.5 | — |
| Glissopal 1000 | — | — | — | — |
| Oppanol B100 | — | — | — | — |
| PPDN30DX | 1 | 1.5 | 1 | 1 |
| Auroren 350S | — | — | 5 | — |
| Tinuvin 928 | 1.5 | — | 1.5 | 1.5 |
| Irganox 1010 | 1.35 | 1.35 | 1.35 | 1.35 |

Mechanical Test Results of Some Pressure Sensitive Adhesive Compositions

180° Peel Test Results at Room Temperature (RT) and 85° C.

TABLE 3

| Sample | 180° Peel to PET at RT (N/mm) | 180° Peel to PET at 85° C. (N/mm) |
|---|---|---|
| Ex.1 | 0.90 | 0.36 |
| Ex.2 | 0.83 | 0.47 |
| Ex.3 | 0.84 | 0.26 |
| Ex.4 | 0.67 | 0.36 |
| Ex.5 | 0.93 | Not determined |
| Ex.6 | 1.00 | 0.21 |
| Ex.7 | 0.53 | 0.30 |
| CE-1 | 0.28 | Not determined |
| CE-2 | 0.02 | 0.20 |

Static Shear Test Results at 90° C.

TABLE 4

| Sample | Static Shear at 90° on stainless steel (min) |
|---|---|
| Ex.1 | >10000 |
| Ex.2 | >10000 |
| Ex.3 | >10000 |
| Ex.4 | >10000 |
| Ex.5 | >10000 |
| Ex.6 | >10000 |
| Ex.7 | >10000 |
| CE-1 | 1 |
| CE-2 | >10000 |

SAFT Test

TABLE 5

| Sample | SAFT on stainless steel (° C.) |
|---|---|
| Ex.1 | >130 |
| Ex.2 | >130 |
| Ex.3 | >130 |
| Ex.4 | >130 |
| Ex.5 | >130 |
| Ex.6 | >130 |
| Ex.7 | >130 |

Water Vapor Transmission Rate (WVTR) Test Results of Some Pressure Sensitive Adhesive Compositions

TABLE 6

| Sample | Sample thickness (micrometers) | Water vapor transmission rate (40° C.; 100% relative humidity) expressed in $g/m^2$/day |
|---|---|---|
| Ex.2 | 20 | 14.7 |
| 467MP | 50 | 622 |

Relative Permittivity Test Results at 100 kHz of Some Pressure Sensitive Adhesive Compositions

TABLE 7

| Sample | Relative permittivity measured at 100 kHz |
|---|---|
| Ex.2 | 2.37 |

Metal Foil Corrosion Test

All pressure sensitive adhesive examples 1 to 7 were submitted to the metal foil corrosion test as detailed above. No color change or other indication of corrosion was observed on the copper foil.

The invention claimed is:

1. A curable pressure sensitive adhesive composition comprising:

a) a non-halogenated butyl rubber component in an amount from greater than 45 wt % to 95 wt %;

b) a tackifier in an amount from greater than 1 wt % to 45 wt %;

c) a multifunctional crosslinking agent comprising at least two nitroso functional groups in an amount from 0.15 wt % to 4 wt %; and d) optionally, a hydrocarbon plasticizer in an amount from 5 wt % to 15 wt %;

wherein the weight percentages are based on the total weight of the curable pressure sensitive adhesive composition.

2. A curable pressure sensitive adhesive composition according to claim 1, which comprises:

a) the non-halogenated butyl rubber component in an amount from greater than 45 wt % to 95 wt %;

b) the tackifier in an amount greater than 1.5 wt % to 45 wt %;

c) the multifunctional crosslinking agent comprising at least two nitroso functional groups in an amount from 0.15 wt % to 2 wt %; and d) optionally, the hydrocarbon plasticizer in an amount from 5 wt % to 10 wt %, wherein the hydrocarbon plasticizer has a softening point value no greater than 25° C. when determined according to Test Method ASTM E28-14;

wherein the weight percentages are based on the total weight of the curable pressure sensitive adhesive composition.

3. A curable pressure sensitive adhesive composition according to claim 1, which comprises:

a) from greater than 55 wt % to 85 wt % of the non-halogenated butyl rubber component;

b) from greater than 10 wt % to 40 wt. % of the tackifier, and wherein the tackifier has a softening point value greater than 70° C. when determined according to Test Method ASTM E28-14;

c) from 0.15 wt % to 2 wt % of the multifunctional crosslinking agent comprising at least two nitroso functional groups; and d) optionally, 5 wt % to 10 wt % of the hydrocarbon plasticizer having a softening point value no greater than 25° C. when determined according to Test Method ASTM E28-14;

wherein the weight percentages are based on the total weight of the curable pressure sensitive adhesive composition.

4. A curable pressure sensitive adhesive composition according to claim 1, wherein the tackifier is selected from the group consisting of rosin resins, terpene resins, coumarone-indene resins, C5-based hydrocarbon resins, C9-based hydrocarbon resins, C5/C9-based hydrocarbon resins, dicyclopentadiene-based resins, and any combinations thereof.

5. A curable pressure sensitive adhesive composition according to claim 1, wherein the multifunctional crosslinking agent comprising at least two nitroso functional groups is selected from the group consisting of dinitroso compounds and polynitroso compounds.

6. A curable pressure sensitive adhesive composition according to claim 1, wherein the multifunctional crosslinking agent comprising at least two nitroso functional groups is selected from the group consisting of dinitrosobenzenes, polydinitrosobenzenes, and any combinations thereof.

7. A curable pressure sensitive adhesive composition according to claim 1, wherein the hydrocarbon plasticizer is selected from the group consisting of polymeric hydrocarbon plasticizers, liquid hydrocarbon plasticizers, and hydrocarbon mineral oils.

8. A curable pressure sensitive adhesive composition according to claim 1 in the form of a single layer, which has a water vapor transmission rate no greater than 30 $g/m^2$/day, when measured on a 20-micrometer thick layer of the curable pressure sensitive adhesive composition after exposure to a temperature of 40° C. and 100% relative humidity for 24 hours.

9. A curable pressure sensitive adhesive composition according to claim 1, which has a 180-degree peel adhesion value above 0.20 N/mm when measured as a tape of the pressure sensitive adhesive composition on a polyethylene terephthalate backing against a polyethylene terephthalate substrate at 85° C.

10. A cured pressure sensitive adhesive obtainable by curing the curable pressure sensitive adhesive composition according to claim 1, wherein the curing is performed by subjecting the curable pressure sensitive adhesive composition to thermal energy.

11. An electronic device comprising a curable pressure sensitive adhesive composition according to claim 1.

12. An electronic device according to claim 11, which is selected from the group consisting of organic light-emitting device modules, organic light-emitting diode display panels, capacitive or resistive touch sensors, capacitive or resistive pressure sensors, and touch-sensitive panels.

13. An electronic device according to claim 12, which is integrated into an article selected from the group consisting of smartphones, mobile phones, tablet PCs, personal computers, notebook PCs, TV, digital cameras, car navigation systems, smartwatches, media players, activity trackers, handheld electronic devices, and any combinations thereof.

14. A method for protecting an electronic device or an electronic component from moisture and air permeation, wherein the method comprises a step of adhesively bonding the curable pressure sensitive adhesive composition of claim 1 to the electronic device or the electronic component.

15. A curable pressure sensitive adhesive composition according to claim 1, wherein the multifunctional crosslinking agent comprising at least two nitroso functional groups is selected from the group consisting of para-dinitrosobenzene, poly-para-dinitrosobenzene, and any combinations thereof.

16. A curable pressure sensitive adhesive composition according to claim 1, wherein the tackifier has a softening point value greater than 110° C. when determined according to Test Method ASTM E28-14.

17. A curable pressure sensitive adhesive composition comprising:

a butyl rubber component in an amount of 94 wt %;

a tackifier in an amount of 1.9 wt %; and a multifunctional crosslinking agent comprising at least two nitroso functional groups in an amount from 0.15 wt % to 4 wt %;

wherein the weight percentages are based on the total weight of the curable pressure sensitive adhesive composition.

18. A curable pressure sensitive adhesive composition comprising:

a butyl rubber component in an amount of 48.1 wt %;

a tackifier in an amount of 40.9 wt %;

a hydrocarbon plasticizer in an amount of 7.2 wt %; and a multifunctional crosslinking agent comprising at least two nitroso functional groups in an amount from 0.15 wt % to 4 wt %;

wherein the weight percentages are based on the total weight of the curable pressure sensitive adhesive composition.

19. A curable pressure sensitive adhesive composition according to claim 1, wherein the tackifier is a petroleum-based hydrocarbon resin.

20. A curable pressure sensitive adhesive composition according to claim 3, wherein the amount of the non-halogenated butyl rubber component is 55 wt % to 75 wt %.

* * * * *